Feb. 14, 1928.

P. J. LYBACK 1,659,036

CLUTCH MECHANISM

Filed June 5, 1923

Inventor:
Peter J Lyback
by attorney
Pane Carpenter

Feb. 14, 1928.

P. J. LYBACK

1,659,036

CLUTCH MECHANISM

Filed June 5, 1923

Inventor:
Peter J. Lyback
by attorney
Jane Carpenter

Feb. 14, 1928.

P. J. LYBACK 1,659,036

CLUTCH MECHANISM

Filed June 5, 1923  4 Sheets-Sheet 3

Inventor:
Peter J. Lyback
by attorney
Paul Carpenter

Patented Feb. 14, 1928.

1,659,036

UNITED STATES PATENT OFFICE.

PETER JACOB LYBACK, OF CHICAGO, ILLINOIS.

CLUTCH MECHANISM.

Application filed June 5, 1923. Serial No. 643,528.

This invention relates broadly to motion imparting devices, and more particularly to improved clutch mechanism for disconnectibly operatively connecting two or more elements for simultaneous operation, this invention being particularly useful when employed for connecting a shaft with two or more elements mounted thereon so that the shaft and such elements may be simultaneously rotated, and while for convenience in describing the device it is illustrated as applied to a line shaft which supports a pair of sleeves adapted for alternate engagement with the shaft through the medium of my improved clutch mechanism, it will be understood that this invention is adapted for other applications or installations, and to other uses, and, therefore, finds a wide field of utility.

The principal objects and advantages which characterize this invention reside in the provision of an improved motion transmission mechanism; the provision of an improved connecting means for disconnectibly connecting two or more elements for simultaneous operation; the provision of an improved motion transmitting means characterized by the embodiment therein of improved connecting means; the provision in a device of the character described, of improved disconnectible connecting means; the provision of an improved motion transmitting means characterized by the embodiment therein of improved disengageable engaging means; the provision, in combination, of improved motion transmitting means and improved clutch mechanism; the provision of improved motion transmitting means characterized by the embodiment therein of improved clutch mechanism and actuating means therefor; the provision of an improved clutch device; the provision of an improved friction clutch device; the provision of an improved expansible ring clutch; the provision of an improved expansible ring clutch in combination with improved operating means therefor; the provision of an improved expansible ring clutch including an improved self-contained operating mechanism therefor; the provision of an improved clutch characterized by the embodiment therein of a variably dimensioned connecting element and improved means for operating said element; the provision of an improved clutch mechanism characterized by the embodiment therein of improved clutch operating mechanism adapted to positively engage and disengage the clutch; and the provision, in combination, of two or more elements to be moved simultaneously, improved connecting means for said elements, and improved actuating means for said connecting means, all contained in a compact, simple, and rugged structure in which the moving parts are reduced to a practicable minimum and are positive in action.

This invention is further and more especially characterized by the provision of an improved expansible ring clutch wherein the motion transmitting element or friction ring is positively actuated into and out of engaging position, as distinguished from the well known expanding ring clutches of the prior art wherein the expansible or contractible ring employed in the clutch is allowed to move into one or the other of its extreme positions by the inherent resiliency of the ring. It will be understood as this description proceeds that references to an expansible ring and means for positively moving the ring into and out of engaging position are intended to include clutch rings which contract into engaging or driving position, and, in fact, any other arrangements of the ring wherein its dimensions are varied against the resiliency of the ring for the purpose of transmitting motion thereby.

The foregoing and such other objects and advantages which may appear or be pointed out as this description proceeds are attained in the structural embodiments illustrated in the accompanying drawings, in which.

Referring more particularly to the drawings, and first to the form of the device illustrated in Figures 1 to 10, both inclusive, the improved clutch of this invention is installed in an arrangement wherein a single driving element is provided, such as the shaft 5, and two driven elements, such as the sleeves 6 and 7, are provided, the clutch, as will hereinafter appear, being arranged to alternately impart motion from the shaft 5 to either of the sleeves 6 and 7. It will be understood, of course, that the clutch may be placed in other arrangements wherein it finds utility.

Figure 1:
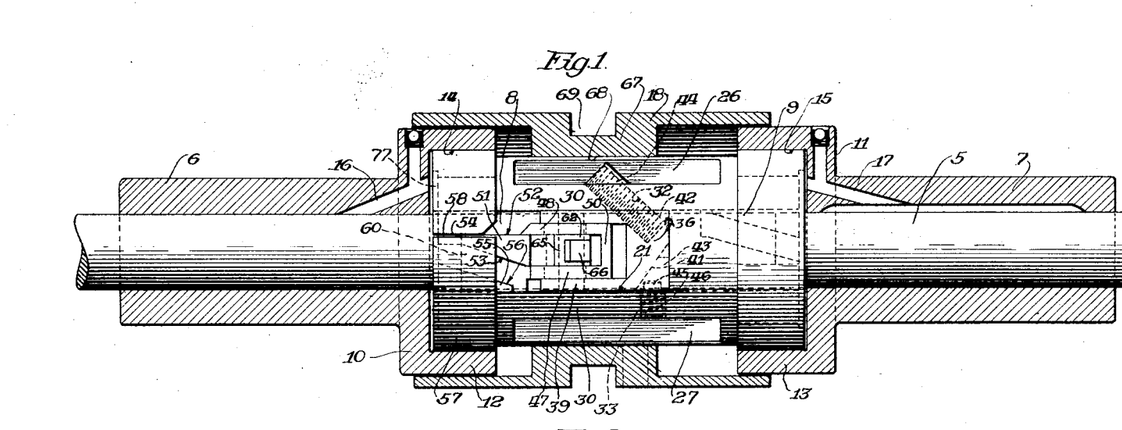
Figure 1 is a longitudinal sectional view of the device of this invention, certain parts being in elevation, illustrating one of its installations.
Figure 2:
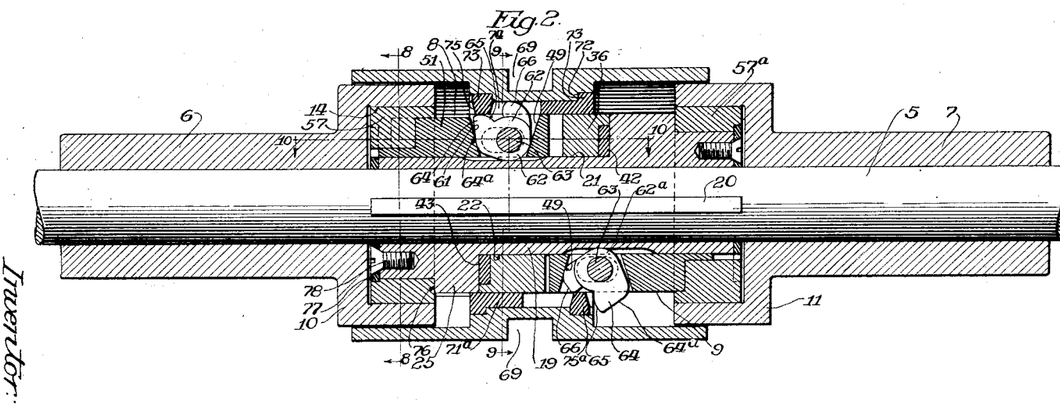
Figure 2 is a longitudinal axial sectional view on a plane substantially at right angles to that of Figure 1.

It will be observed upon reference to Figures 1 and 2 that two clutch members and associated parts are provided for alternately connecting the shaft 5 to either of the sleeves, said clutches being generally designated 8 and 9, repectively. The clutch 8 will be described in detail, with general reference to the clutch 9.

The sleeves 6 and 7 are substantially identical in construction and include annular enlargements 10 and 11 presented toward the clutches 8 and 9, respectively, said enlargements having the clutch drums 12 and 13 formed integrally therewith and provided with internal cylindrical faces 14 and 15, respectively. Each of the sleeves is provided with one of the lubricating ducts 16 and 17, respectively.

The clutch drums 12 and 13 cooperate with the clutch shifting collar 18 to form a substantially closed housing as will best be seen from an inspection of Figures 1 and 2.

Figure 3:
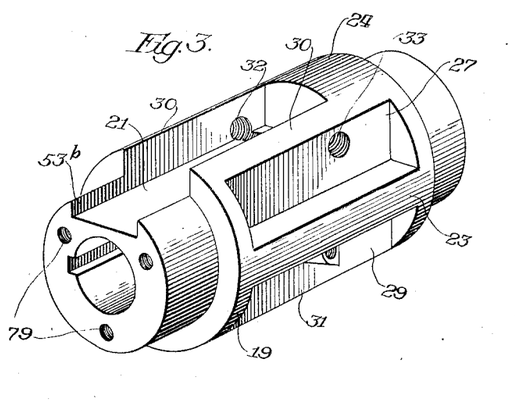
Figure 3 is a perspective view of one of the parts, which I term the clutch hub.
Figure 4:
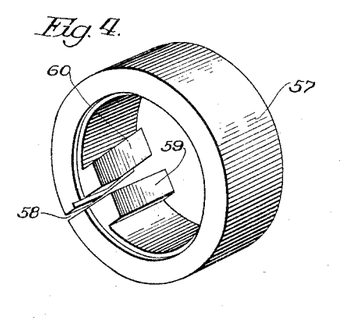
Figure 4 is a perspective view of a part which I term the clutch ring.
Figure 9:
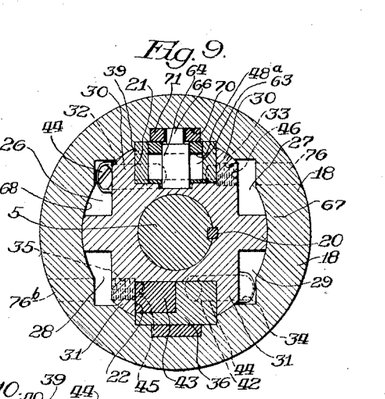
Figure 9 is a transverse sectional view taken on line 9—9 of Figure 2 looking in the direction indicated by the arrows.

The clutch devices of this invention include complemental parts and a hub 19 which carries said parts, said hub 19 being fixed on the shaft 5, for rotation therewith by the provision of a key or spline 20. The hub is best seen in Figures 2 and 3, and said hub is provided with the trough portions 21 and 22 which extend at diametrically opposite points from opposite ends of the hub toward the medial portion thereof, said hub having a cylindrical enlarged portion 23, through which said troughs extend, the troughs, respectively, terminating short of the ends of the enlargement 23 to form abutments 24 and 25. At the outer ends the troughs extend to the adjacent end of the hub. The enlargement 23 is provided with a series of pockets 26, 27, 28 and 29, which have their walls relatively angularly related and preferably in planes tangential to the peripheral surface of the enlargement 23, and in planes parallel to the side walls of the troughs 21 and 22 for a purpose which will presently appear. This arrangement of the troughs 21 and 22 and pockets 26, 27, 28 and 29 affords parallel oppositely extending walls 30—30 and 31—31. The left hand wall 30 as viewed in Figures 3 and 9 is provided with an inclined or diagonal threaded opening 32, and the right hand wall has a threaded opening 33 which is at substantially right angles to the wall 30, it being observed that both of the openings 32 and 33 are located toward the inner end of the trough 21. Similarly, the walls 31—31 are provided with openings 34 and 35 complemental to the openings 32 and 33 but relatively oppositely disposed, as will be seen from an inspection of Figure 9.

Figure 6:
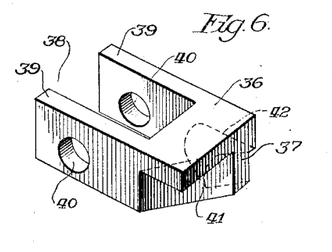
Figure 7:
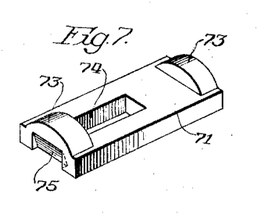

The trough 21 serves as a receiver for an adjustable yoke 36, said yoke being shown in detail in Figure 6. The yoke comprises a body 37 bifurcated at 38 to provide spaced parallel arms 39—39, said arms being provided with aligned bearings 40—40. One of the corners of the block is undercut to provide the inclined wall 41 and a diagonal recess 42 is formed in the opposite wall of the body 37 and has a base wall 42ᵃ near the wall 41. When said yoke is in the trough a wedge element 43 lies in the recess formed by the wall 41 and the trough and a bolt 44 threaded in the opening 32 lies in the recess 42 in said yoke and abuts the wall 42ᵃ. The wedge 43 is recessed to receive the reduced end 45 of a bolt or screw 46 which threads into the opening 33, and by relative adjustment of the screws 44 and 46 the position of the yoke longitudinally in the trough may be varied.

It will be observed from Figure 9 that the same arrangement is provided in the trough 22 and, therefore, a detailed discussion of same will not be necessary.

Figure 5:
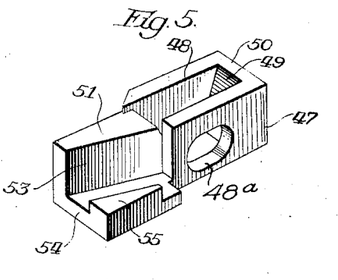
Figures 5, 6, and 7, are perspective views of detail parts.

Within the yoke 36, between the arms 39, there is provided a slidable clutch key 47, best shown in Figure 5, and including a box-like housing 48 having the inner surface 49 of its rear wall 50 disposed in an inclined plane as appears in Figure 2.

The clutch key member includes, with the housing 48, a key member 51 provided with a plain surface 52 and a surface 53 arranged at an inclination to the surface 52. The key portion 51 has a base 54 provided with an upstanding abutment 55, the inner surface 56 of which is parallel to the surface 53. The abutment 55, as is best seen in Figure 5, extends but a short distance from the base 54.

Figure 8:
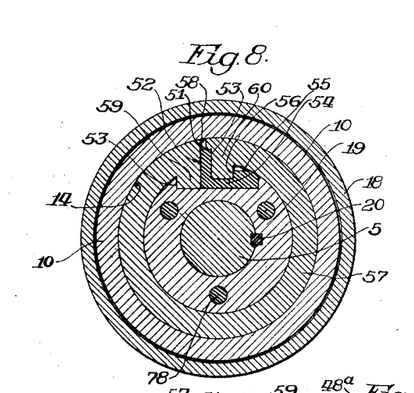
Figure 8 is a transverse sectional view taken on the line 8—8 of Figure 2, looking in the direction indicated by the arrows.
Figure 10:
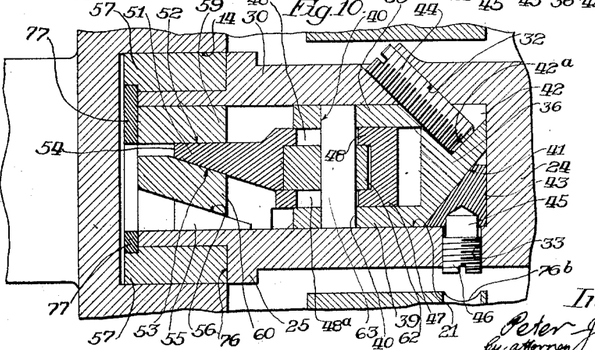
Figure 10 is an enlarged longitudinal sectional view taken on line 10—10 of Figure 2, looking in the direction indicated by the arrows.

Referring now to Figures 2, 8 and 10, the arrangement of the key, clutch ring, and operating mechanism may best be understood. The clutch ring 57 is split at 58 and is formed, adjacent said split portion, with an inwardly directed lug 59 which lies between the surface 52 of the key and the adjacent wall 53<sup>b</sup> of the trough 21, and said ring is also provided with an inwardly directed lug 60 which seats on the base 54 of the key member between the surfaces 53 and 56. The lug 59 is substantially straight, that is, having its longitudinal axis disposed in a plane substantially parallel to the axis of the shaft 5, whereas the lug 60 has both of its engaging surfaces inclined with respect to the longitudinal axis of the shaft 5, and, therefore, fits snugly and evenly between the surfaces 53 and 56. This will be clearly noted from an inspection of Figure 10.

The inner surface of the key member 51 is disposed in an inclined plane as indicated at 61 oppositely to the inclined surface 49, and, in the housing formed by the side walls of the member 48 and the walls 49 and 61, there is provided an operating cam 62, mounted upon a shaft 63 transversely fixedly arranged in the openings 40—40 provided in the arms 39 of the yoke 36, said shaft passing through the sides of the housing 48, the latter having slots 48<sup>a</sup> for accommodating said shaft.

The cam as best shown in Figure 2, is provided with the radial enlargement 64, having surfaces 64<sup>a</sup>, 65, and the radial enlargement 66, the enlargement 64 being wider transversely than the face of the enlargement 66 for a purpose which will presently appear.

The shifting collar 18 is substantially cylindrical and is provided with an internal annular projection 67, which, for the greater part of its inner surface 68, is plain, that is, is in slidable contact with the cylindrical enlargement 23 on the hub 19. The outer surface of the collar at substantially the medial portion thereof is provided with an annular groove 69 which receives the forked end of a shifting lever or other element, not shown, so that the sleeve may be rectilinearly displaced for shifting the clutches.

At a point between the key yoke and the inner surface of the enlargement 67, the latter is provided with a substantially rectangular longitudinal recess or pocket 70 which receives a cam plate 71 the recess 70 having shoulders 72 formed at its ends to accommodate the abutments 73 formed on the ends of the cam plate 71. The cam plate thus is held in position against longitudinal displacement by the abutments 73 and shoulders 72, and against transverse displacement by the yoke and side walls of the recess 70.

The cam plate is provided with an elongated slot 74 for reception of the cam portion 66, said slot extending from substantially the medial portion of the plate toward one end of the latter and terminating at one of the abutments. Beneath the abutment there is provided a tapered wall 75 and the surfaces of said wall 75 are adapted to engage the projections on the cam 62 as the collar is shifted. Furthermore, the wall 75 abuts the enlargement 64 on the cam when the clutch is shifted to rotate said cam, as seen in Figure 2.

The clutch ring 57 is retained against longitudinal displacement by engagement with the abutment 25 and an annulus 77 is secured to the end of the clutch hub by the provision of screws 78, entering openings 79, said annulus engaging an annular shoulder formed on the adjacent portion of the ring 57. This is best shown in Figures 2 and 10.

The parts described so far serve to operate the clutch ring 57, and this clutch ring operates to connect the shaft 5 with the sleeve 6 by expansion of the clutch ring 57 and its frictional engagement with the inner surface 14 of the drum 10, this structure being duplicated for operating the other clutch ring 57<sup>a</sup> which engages the inner surface 15 of the drum 13 formed on the sleeve 7 when the clutch 57 is released. To distinguish between the cam for operating, the clutch ring 57 and that for operating the clutch ring 57<sup>a</sup>, the numeral 62<sup>a</sup> has been applied to the cam shown at the lower part of Figure 2. It follows that when the cam 62 is in the position shown in Figure 2, which is the engaging position, the cam 62<sup>a</sup> will be in the disengaging position so that at no time can both of the clutch rings become engaged with their respective drum surfaces.

In order to facilitate adjustment, insertion or removal of the screws 46 provided for holding the wedges 43, openings 76<sup>b</sup> are provided in the shifting collar 18 opposite the screws 46 and 44, to permit the introduction of a screw-driver or other tool. Thus the screws 46 become, in effect keys, that is, these screws serve, with the clutch collar 18, as the means for maintaining the parts when assembled in proper relationship. It will be observed that the rotatable cam 62 is supported in part by the wedge member, and serves to connect the latter and the sleeve, which actuates the same in such a manner that the degree of motion of the wedge is considerably less than that of the sleeve and yet in the same direction.

In the operation of the clutch, when the collar 18 is shifted to the left as viewed in Figures 1 and 2, the tapered wall 75 engages the surface 65 of the projection 64 on the cam 62 and partially rotates said cam on its shaft 63. At the same time the opposite cam plate 71<sup>a</sup> carrying the tapered abutment 75ª engages the lug 66 on the cam 62ª and imparts a partial rotation to said cam to move it to the position shown in Figure 2.

The rotation of the cam 62 into the position shown in Figure 2 imparts rectilinear motion to the key member 47 to force the wedge portion 51 thereof between the two lugs 59 and 60 on the clutch ring 57, expanding said ring into frictional engagement with the surface 14 of the drum 12. The movement which was imparted to the cam 62ª automatically brings the projection 66 of said cam into engagement with the rear wall 49 of the complemental key member, withdrawing said key member sufficiently to permit the clutch ring 57ª to be contracted. This ring is positively withdrawn from the drum surface 15 by virtue of the fact that the surfaces 53 and 56 of the key member engage both sides of the lug 60 on the clutch ring and thus the ring is positively actuated. It follows that the ring is positively actuated into engaged position.

When the clutch collar 18 is moved to the right as viewed in Figure 1, the above operation is reversed, that is, the clutch ring 57 is positively withdrawn from driving engagement with the drum 12 and the clutch ring 57ª is positively expanded into engagement with the drum 13. It will thus be seen that the alternate operation of the clutches is positive and that the clutch rings cannot stick to their respective drums, which happens where the resiliency of the ring is alone relied upon for retraction.

The purpose of the slots 74 provided in the cam plates 71 will become apparent when it is seen that the projections 66 cooperate with said slots and with the engagement which takes place between the projections 64 and the walls 65, to lock the clutch against accidental disengagement from either of its driving positions. It will also be seen that it is convenient that the projections 66 be made of a lesser width than that of the projections 64 so as to economize in space in these parts as well as to afford means for accomplishing the locking function.

Figure 11:
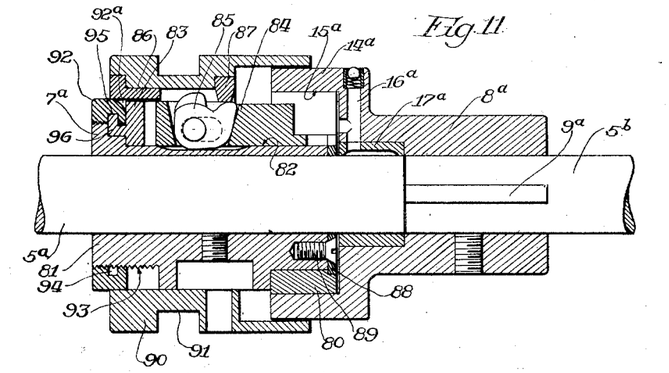
Figure 11 is a longitudinal sectional view of an alternate form of this invention.

In the alternate form of the invention shown in Figure 11 the essential features of the device of Figures 1 to 10 are therein embodied, and for this reason a description in detail of all of the parts of the device of Figure 11 is not necessary.

In Figure 11 there is provided a shaft 5ª and a shaft 5ᵇ, the clutch device indicated in its entirety at 7ª being affixed to the shaft 5ª, and a connecting sleeve 8ª being fixed, by a key 9ª, to the shaft 5ᵇ. The shafts 5 and 5ᵇ are, of course, in abutting relationship and the shaft 5ª may be connected to a driving means and the shaft 5ᵇ may be connected to a driven element, or vice versa.

The sleeve 8ª is provided with a lubricating duct 16ª and a bearing 17ª for the adjacent end of the shaft 5ª, so that said shaft is mutually supported by a bearing (not shown) and by the bearing 17ª in said sleeve, and thus assures alinement of the shafts.

The sleeve 8ª is furthermore provided with a drum 14ª having an internal friction surface 15ª against which the clutch ring 80 is adapted to be forced.

The clutch member 7ª includes the clutch hub 81, which is provided with a longitudinal trough or channel 82 for reception of the key yoke 83, and the key 84. The key 84 and the cam member 85, cam plate 86 and the abutment 87 carried thereby, are all substantially identical with the corresponding parts shown and described hereinabove in connection with Figures 1 to 10, both inclusive, and, therefore, will not be described in detail here. An annulus 88 secured by a screw 89 to the end of the hub 81 adjacent the sleeve 8ª prevents accidental displacement of the clutch ring 80.

The cam plate 86 is carried by the clutch shifting collar 90 which substantially encloses the clutch mechanism in a manner similar to the clutch collar 18 previously described. The collar 90 is provided with an external annular groove 91 for receiving a forked member, not shown, for shifting said collar.

While the same means for retaining adjustably the yoke members 36 of the form of the invention previously described may be employed for retaining the yoke member 83 in Figure 11, I have substituted as an alternate arrangement a ring 92 which is internally threaded for engagement with the outer threaded end 93 of the hub 81, and said ring is provided with an internal annular groove 94, said groove being adapted to receive the outwardly turned end 95 of a lug 96 formed on the outer wall of the yoke 83. The ring may be provided with openings in its outer surface so as to permit of the application of a spanner wrench or other convenient tool thereto for rotating said ring, such rotation of the ring serving to longitudinally adjust the yoke and maintain it in an adjusted position.

It will be seen that when the clutch collar 90 is shifted to the right as viewed in Figure 11 the abutment 87 will cause the cam 85 to move the key member 84 for expanding the clutch ring 80 and thus connecting the shafts 5ª and 5ᵇ; and similarly to the form of the invention previously described, the clutch is locked by the abutment 87 overriding the adjacent lug on the cam 85 and preventing rising of the cam and release of the clutch.

A convenient manner of assembling the device of Figures 1 to 10, inclusive, may be as follows: The clutch hub 19 is placed at the desired point on the shaft 5, and keyed in position to said shaft, as explained. The key members and cams 62 and 62ª are then inserted into their respective yoke members, and said members with the keys and cams are deposited in the channels or troughs 21 and 22, the keys 51 having the clutch rings associated therewith and the yokes being inserted from the outer ends of the troughs, so that when the yokes are thus inserted the keys and clutch members are then in position. One of the clutch ring retaining members 77 may then be applied and the screws 78 inserted. The wedges 43 are applied just previous to moving the yokes back into their respective troughs, and it follows that when the assembly so far explained is completed all the moving parts carried by the clutch hub are in proper position with the exception of one of the clutch rings. The screws 44 and 46 are then inserted into their proper position and adjusted.

The device is now ready to receive the clutch shifting collar 18 and its cam plates, and these latter are applied, of course, previous to the application of the collar to the clutch. The collar is then applied to the clutch assembly by inserting the assembly from its left end, as viewed in Figure 2, into the collar. The cam 62 must be in the position shown in Figure 2, and similarly the cam 62ª must be in the position there shown, so that as the collar 18 and its cam plates are moved onto the clutch assembly the cams will take the proper relationship to the cam plates and to each other.

The remaining clutch ring is now applied, and secured, and the sleeves 6 and 7, may then be placed on the shaft 5 and fixed against longitudinal displacement in any desired manner so that they will be freely rotatable in fixed positions on the shaft. It will be understood that in applying the drums 12 and 13 over their respective clutch rings, the latter should be contracted temporarily by shifting the collar 18.

After the assembly is completed, proper adjustment of the parts may be had by applying a screw driver or other suitable tool to the screws 46 or 44, or both, through the openings 76ᵇ. It will be observed that the clutch mechanism when assembled off the shaft 5, may be bodily applied to the shaft, so that the device becomes self-contained, and with the sleeves 6 and 7 may be placed at any point on a shaft as conditions may demand.

The device of Figure 11 is assembled similarly to the device of Figures 1 to 10, but in applying the ring 92 to the yoke 83 and hub 81 it is necessary that the yoke be placed in position so that the projection 95 may engage in the groove 94, and to this end the ring 92 may either be made in two parts, which parts are held by the clutch collar 90 against separation, or said ring 92 may be provided with an external recess 92ª for accommodating the outer portion of the wall of the yoke 83 when the member 95 is introduced into the groove 94. When this is done the collar 92 is turned up as fas as the threads 93 will permit on the hub 81 and then the yoke inserted, whereupon the collar may be backed off to the proper point.

I found that in the larger clutches embodying this invention, and in other instances, it is desirable that movement in the nature of a double action be imparted to the clutch rings or ring in expanding and contracting same, and to this end the device of Figures 12 to 16, inclusive, has been designed.

In the device of Figures 12 to 16 the structural features of the devices of Figures 1 to 10, and Figure 11 have been essentially adhered to with the exceptions pointed out below.

Reference now being had to Figures 12 to 16, inclusive, there is provided the sleeve 6ª which corresponds to the sleeve 6 shown in Figure 1, said sleeve having an enlargement 10ª provided with an internal friction surface 25ª.

Figure 14:
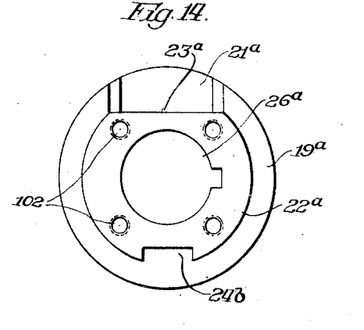
Figure 15:
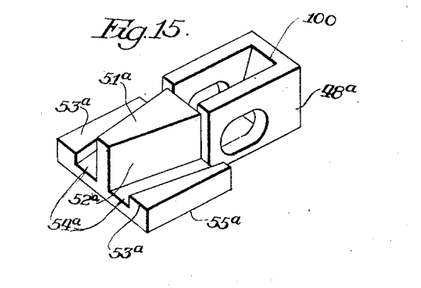
Figure 16:
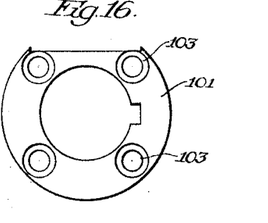

The clutch hub 19ª is similar in construction to the clutch hub shown in Figure 3, with the exception that, while, as shown in Figure 14, the trough 21ª has its base surface 23ª tangential to the bore 26ª of the hub, the projecting members shown in Figure 3 are omitted. Similarly to the device of Figure 3 the hub 19ª is reduced on its end as at 22ª, Figure 14, to receive the clutch ring 57ᵇ. This reduced portion 22ª is provided with a keyway 24ᵇ for reception of a key lug 99 which is intended to seat in said keyway when the clutch ring is applied and prevent rotation of the clutch ring relative to the hub.

The trough or groove 21ª serves to receive a yoke member 36ª which carries the key member 100 which is modified in accordance with the present form of the device. The construction of the yoke is similar to that shown in Figures 6 and 10 and is adjusted in a similar manner by the provision of the screws 44ª and 46ª and the wedge 43ª.

Similar to the yoke 36 the yoke 36ª carries a transverse shaft 63ª and a cam 66ª similar to the cam 62 previously described, and said cam functions to displace the key member in the yoke as previously described.

The slidable clutch key member includes, with its housing 48ª, a key or wedge member 51ª having two converging surfaces 52ª, and complemental projections 53ª—53ª spaced therefrom and affording grooves 54ª which generally converge toward the outer end of the key member.

The key member is placed in the yoke with its wedge portion projecting from the outer end of the trough 21ª and the base 55ᵃ of the key lies on the surface 23ᵃ and is slidable longitudinally of the clutch hub on said surface.

Figure 12:
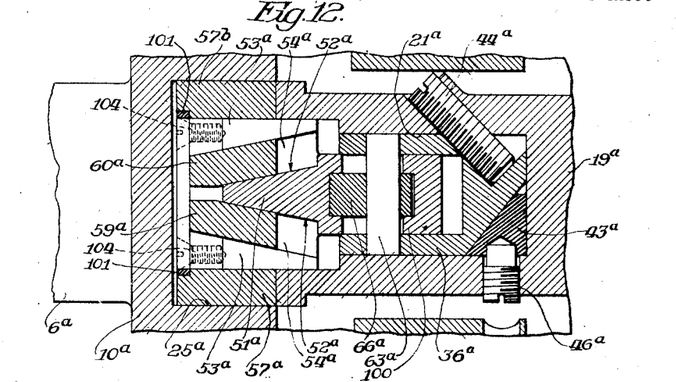
Figure 12 is a view similar to Figure 10, of another alternative or modified form of this invention.
Figure 13:
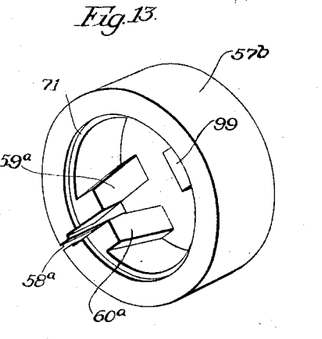
Figures 13 to 16, inclusive, illustrate detail parts of the device of Figure 12.

The clutch ring 57ᵇ is split at 58ᵃ and is formed, on either side of the opening thus provided, with inclined abutments or inwardly directed lugs 59ᵃ and 60ᵃ, and when said ring is in position on the reduced portion 22ᵃ of the hub the abutments 59ᵃ and 60ᵃ seat in the grooves 54ᵃ provided in the key member, the wedge or key 51ᵃ being disposed in the space between said abutments, as best seen in Figure 12.

The clutch ring is provided with an annular shoulder 71ᵃ for reception of the retaining disc or washer 101, and, as best seen in Figure 14, the end face of the reduced part 22ᵃ of the clutch hub is provided with openings 102 for the reception of screws 104, or the like fastening elements, which pass through countersunk openings 103 provided in the washer 101, said washer thus preventing endwise displacement of the clutch ring.

In the operation of this device, it will be observed upon reference to Figure 12, that when the clutch key is moved longitudinally of the clutch hub the wedge or key portion 51 will be forced between the abutments 59ᵃ and 60ᵃ, thus expanding the ring in both directions from the key rather than in one direction as is the case in the device of Figures 1 to 11. It will be observed that upon withdrawal of the key for releasing the clutch, the projections 53ᵃ having their inner surfaces parallel to the surfaces 52ᵃ of the key, will engage the outer surfaces of the abutments 59ᵃ and 60ᵃ and thus positively contract the ring.

It will be obvious that while only one ring and operating mechanism therefor have been illustrated, this structure is duplicated when constructing a clutch mechanism similar to that shown in Figures 1 and 2, and it will also be understood that, in applying the key and key member of Figures 12 to 16, inclusive, to the device of Figure 11, the same means for securing the mechanism to the shaft and to the clutch hub as that provided in Figure 11 may be embodied in this device.

From the foregoing it will be seen that the principal point of difference between the device of Figures 12 to 16 and that of the devices of Figures 1 to 11 resides in the fact that the ring is expanded in both directions from an anchoring point, whereas in the other forms of the invention the ring is expanded in one direction only. While the form of the device shown in Figures 12 to 16 may be embodied in the form of the invention first described, it will be readily appreciated that this latter form is more particularly adapted to larger clutches where in the matter of efficiency it is desirable that a minimum amount of motion longitudinally of the key member be made to attain a desired degree of expansion of the clutch ring.

Having thus described my invention and illustrated its use, what I claim as new and desire to secure by Letters Patent is:

1. In combination, an element to be moved, an actuating element, and pivoted means connecting said elements whereby motion of the actuating element is transmitted to the element to be moved in the same direction but through a shorter path than that of the actuating element, a clutch ring connected to the element to be moved, said ring having its dimensions varied positively in both directions by said actuating element.

2. In combination with a driving element and a pair of driven elements, of clutch mechanisms including expanding rings, and means for alternately positively expanding and contracting and locking said rings, including a sleeve substantially enclosing said clutch mechanisms.

3. In a device of the character described, in combination, a clutch ring, a wedge member moving in a substantially fixed rectilinear path for positively varying the dimensions of said ring, an actuating member moving in a substantially rectilinear path for actuating said wedge member, and a rotatable member connecting said wedge and actuating members and partially contained by the latter.

4. In a device of the character described, in combination, a clutch ring, a wedge member moving in a substantially fixed rectilinear path for positively varying the dimensions of said ring, an actuating member moving in a substantially rectilinear path for actuating said wedge member, and a cam member connecting said wedge and actuating members and partially contained by the latter.

5. In a device of the character described, in combination, a clutch ring, a wedge member moving in a substantially fixed rectilinear path for positively varying the dimensions of said ring, an actuating member moving in a substantially rectilinear path for actuating said wedge member, and a rotatable member supported in part by said wedge member and connecting the latter and said actuating member for reducing the travel of the wedge below that of the actuating member.

6. In a device of the character described, in combination, a clutch ring, a wedge member moving in a substantially fixed rectilinear path for positively varying the dimensions of said ring, an actuating member moving in a substantially rectilinear path for actuating said wedge member, and a rotatable member supported in part by said wedge member and connecting the latter and said actuating member for translating motion between said actuating and wedge members whereby their directions of motion are the same.

7. In a device of the character described, in combination, a variably dimensioned ring, a wedge engaging said ring at two points, an actuating element for said wedge, and an intermediate connecting member between said actuating element and said wedge for causing the latter to move simultaneously with the actuating element in the same direction as but to a lesser extent than said actuating element.

8. In a device of the character described, in combination, a variably dimensioned ring, a wedge engaging said ring at two points, an actuating element for said wedge, and a cam member between said actuating element and said wedge for causing the latter to move simultaneously with the actuating element in the same direction as but to a lesser extent than said actuating element.

9. In a device of the character described, in combination, a clutch ring, a wedge member moving in a substantially fixed rectilinear path for positively varying the dimensions of said ring, an actuating member moving in a substantially rectilinear path for actuating said wedge member, and a rotatable member supported in part by said wedge member and connecting the latter and said actuating member for reducing the travel of the wedge below that of the actuating member, said rotatable member serving to lock said wedge in a predetermined position.

10. In a clutch mechanism, the combination of a variably dimensioned ring, a rectilinearly movable member for positively varying the dimensions of said ring, a carrying yoke for said rectilinearly movable member, means for adjusting said yoke without removal from the clutch, and means for locking said yoke in position.

11. In a clutch mechanism, the combination of a variably dimensioned ring, a rectilinearly movable member for positively varying the dimensions of said ring, an adjustable carrying yoke for said rectilinearly movable member, and an actuating member for said rectilinearly movable member substantially encompassing the latter and serving to retain said carrying yoke against displacement in one direction.

12. In a clutch mechanism, the combination of a variably dimensioned ring, a rectilinearly movable member for positively varying the dimensions of said ring, an adjustable carrying yoke for said rectilinearly movable member, an actuating member moving in a plane substantially parallel with the plane of movement of said rectilinearly movable member, and a connecting member within the confines of said rectilinearly movable member and carried by said yoke for operatively connecting the latter to said actuating member.

13. In a clutch mechanism, the combination of a variably dimensioned ring, a rectilinearly movable member for positively varying the dimensions of said ring, an adjustable carrying yoke for said rectilinearly movable member, an actuating member encompassing said last mentioned member and moving in a plane substantially parallel with the plane of movement of said member, and a connecting member within the confines of said rectilinearly movable member and carried by said yoke for operatively connecting the latter to said actuating member.

14. In a clutch, a variably dimensioned ring, a rigid wedge member for varying the dimensions of said ring, an actuating member for imparting movement to said wedge, a pivoted connecting link for said wedge and actuating member, said wedge and actuating members being simultaneously movable in the same direction in parallel planes.

15. In a clutch, a variably dimensioned ring, a rigid wedge member for varying the dimensions of said ring, an actuating member for imparting movement to said wedge and forming a housing therefor, a pivoted connecting link for said wedge and actuating member, said wedge and actuating members being simultaneously movable in parallel planes.

16. In a clutch, a variably dimensioned ring, a rigid wedge member for varying the dimensions of said ring, and engaging the latter at two points, an actuating member for imparting movement to said wedge, said wedge and actuating members being simultaneously movable to different distances in the same direction and in parallel planes.

17. In a clutch, a variably dimensioned ring, a wedge for varying the dimensions of said ring, a yoke for supporting and in which said wedge is movable, and an enclosing housing for said yoke and wedge and for imparting movement to the latter.

18. In a clutch, a variably dimensioned ring, a wedge for varying the dimensions of said ring, a yoke for supporting and in which said wedge is movable, means for adjusting and locking said yoke, and an enclosing housing for said yoke and wedge and for imparting movement to the latter.

In testimony whereof I have hereunto signed my name.

PETER JACOB LYBACK.